Patented Dec. 4, 1928.

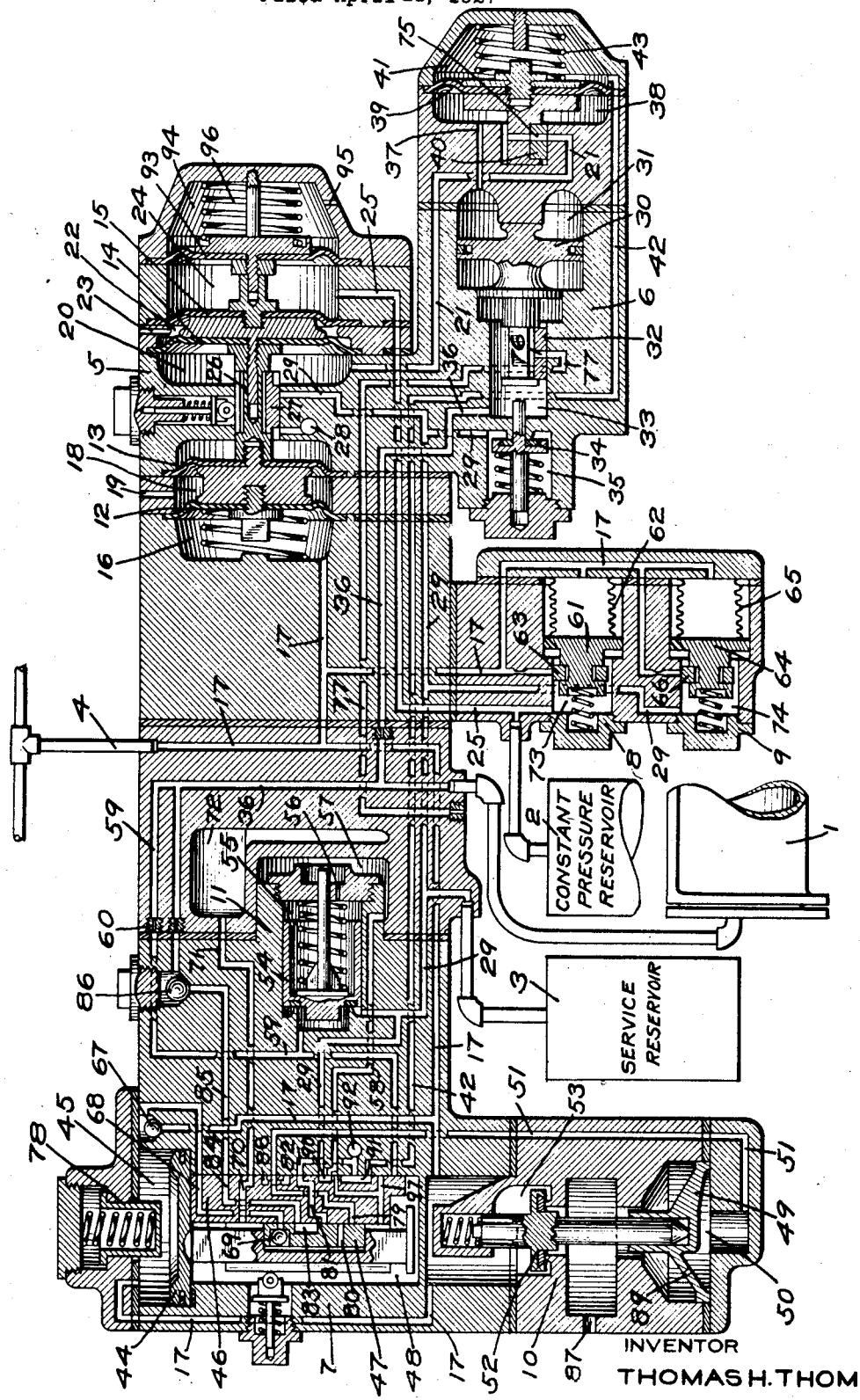

1,693,943

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 11, 1927. Serial No. 182,745.

This invention relates to fluid pressure brakes, and has for its principal object to provide an improved brake controlling apparatus.

Other objects and advantages will appear in the following more detailed description of the invention.

In the accompanying drawing, the single figure is a diagrammatic sectional view of a brake controlling valve device embodying my invention.

The apparatus may comprise a brake cylinder 1, a constant pressure reservoir 2, a service reservoir 3, a brake pipe 4, a service pilot valve device 5, a service application valve device 6, an emergency valve device 7, reservoir charging valve devices 8 and 9, a quick action valve device 10, and an emergency application supply valve device 11.

The service pilot valve device 5 comprises a series of connected flexible diaphragms 12, 13, 14, and 15, spaced apart to form chambers. The chamber 16 at the left of diaphragm 12 is connected to passage 17 leading to brake pipe 4. The chamber 18, intermediate the diaphragms 12 and 13 is open to the atmosphere through a port 19. The chamber 20, intermediate the diaphragms 13 and 14 is connected to a passage 21. The chamber 22, intermediate the diaphragms 14 and 15 is open to the atmosphere through a port 23, and chamber 24, at the right of diaphragm 15 is connected through a passage 25 with the constant pressure reservoir 2.

The connecting stem 26 of the diaphragms is adapted to operate a slide valve 27, and in release position of the slide valve, the chamber 20 is connected to an exhaust port 28. In application position, chamber 20 is connected to a passage 29, leading to service reservoir 3.

The service application valve device 6 comprises a piston 30 contained in piston chamber 31, a release slide valve 32, contained in valve chamber 33, and a supply valve 34, contained in valve chamber 35, said valves being operated by the movement of piston 30. Valve chamber 33 is connected through passage 36 with the brake cylinder 1, and valve chamber 35 is connected to service reservoir passage 29.

Piston chamber 31 is connected, through a passage 37 with a chamber 38 at one side of a flexible diaphragm 39 and said diaphragm is adapted to operate a slide valve 40 for controlling communication from passage 21 to chamber 38. The chamber 41 at the right of diaphragm 39 is connected to a passage 42 and contains a coil spring 43 which exerts pressure on said diaphragm.

The emergency valve device 7 comprises a piston 44 contained in piston chamber 45, which is connected to brake pipe passage 17 and a main slide valve 46 and a graduating slide valve 47 contained in valve chamber 48 and adapted to be operated by piston 44.

The quick action valve device 10 comprises a piston 49 contained in piston chamber 50 which is connected to a passage 51, leading to the seat of slide valve 46, and a brake pipe vent valve 52, contained in valve chamber 53 and adapted to be operated by piston 49, the chamber 53 being connected to brake pipe passage 17.

The emergency supply valve device 11 comprises a valve piston 54 having chamber 55 at the right of the valve piston open through a restricted port 56 to a chamber 57 which is connected to a passage 58, leading to the seat of slide valve 46. In the seated position of the valve piston 54, the outer seated area, connected to service reservoir passage 29, is cut off from an inner seated area, which is connected, through a passage 59, with brake cylinder passage 36, the passage 59 containing a choke plug having a restricted port 60.

The reservoir charging valve device 8 controls the charging of the constant pressure reservoir 2 and comprises a diaphragm head 61 connected to a bellows diaphragm 62 and adapted to operate a slide valve 63. The charging valve device 9 controls the charging of the service reservoir 3 and comprises a diaphragm head 64 connected to a bellows diaphragm 65 and adapted to operate a slide valve 66.

In operation, when fluid under pressure is supplied to the brake pipe 4, fluid flows through the brake pipe passage 17 to piston chamber 45 of the emergency valve device 7 and through passage 17 past ball check valve 67 to the seat of slide valve 46. With the emergency valve device 7 in release position, as shown, the brake pipe passage registers with a port 68 through slide valve 46, so that fluid flows from the brake pipe through said port and through a port controlled by a check valve 69 in slide valve 47 to the valve chamber 48. Fluid flows from valve chamber 48, through port 70 and passage 71 to a quick action chamber 72.

When the brake pipe pressure has been increased to a predetermined degree, the charging valve device 8 is operated so as to shift the valve 63 and open passage 17 to valve chamber 73, which is connected to reservoir passage 25. The constant pressure reservoir 2 is then charged with fluid at brake pipe pressure. In the same manner, the charging valve device 9 is operated so as to shift the valve 66 and open brake pipe passage 17 to valve chamber 74, which is connected to the service reservoir passage 29, so that the service reservoir 3 is also charged with fluid at brake pipe pressure.

With the chamber 16 of the valve device 5 charged to the standard brake pipe pressure, the parts are so proportioned that the slide valve 27 is held in its right hand position, in which chamber 20 is open to exhaust port 28. The chamber 20 being at atmospheric pressure, the chamber 31 is also at atmospheric pressure, since said chambers are connected by way of passage 37, chamber 38, and passage 21, when slide valve 40 is in the position shown, with port 75 registering with passage 21.

With piston chamber 31 at atmospheric pressure, the piston 30 will be in its right hand position, as shown in the drawing, in which chamber 33 is connected through port 76 in slide valve 32 with an atmospheric exhaust passage 77. The chamber 33 is connected to brake cylinder passage 36, so that the brake cylinder 1 is now open to the exhaust, and the brakes are released.

If it is desired to effect a service application of the brakes, the brake pipe pressure is reduced in the usual manner, and consequently the pressure in diaphragm chamber 16 is reduced to the same extent.

The pressures on the diaphragms of the valve device 5 are thus unbalanced, so that the fluid pressure in chamber 24 causes movement of the diaphragms toward the left. The slide valve 27 is thus moved so as to close the exhaust port 28 and open the passage 29 to valve chamber 20.

Fluid under pressure is then supplied from the service reservoir 3, through passage 29 to chamber 20 and continues to flow until the pressure in said chamber has increased to a degree sufficient to move the diaphragms toward the right, by reason of the differential area of the diaphragm 14 with respect to the diaphragm 13.

Fluid under pressure from the valve chamber 20 is supplied through passage 21, and port 75 in slide valve 40 to chamber 38. The diaphragm 39 is subject to the pressure of a spring 43 and the diaphragm chamber 41 is connected through passage 42 and cavity 91 in the emergency slide valve 46 with an exhaust port 92, so long as the emergency slide valve 70 remains in its normal release position.

Consequently, the diaphragm 39 will hold the valve 40 in its open position unless the pressure in chamber 38 is increased to a degree slightly exceeding the pressure of spring 43. The pressure of spring 43 is such that for ordinary reductions in brake pipe pressure in service applications of the brakes, the pressure built up in chamber 20 and in chamber 38 will not exceed the pressure of spring 43, and consequently the valve 40 will be held open, permitting the pressure in chamber 31 to build up to equal that in chamber 20 and in chamber 38.

The pressure in chamber 31 operates to shift the piston 30 toward the left, first moving the slide valve 32 to close the exhaust port 77 and then operating to unseat the valve 34.

With valve 34 unseated, fluid under pressure is supplied from the service reservoir 3 through passage 29 and chamber 35 to chamber 33 and thence through passage 36 to the brake cylinder 1. The brake cylinder pressure is thus built up until the pressure in valve chamber 33 and acting on the piston 30 slightly exceeds the pressure of fluid in piston chamber 31, when the piston will be moved toward the right sufficiently to permit the valve 34 to seat.

Should leakage from piston chamber 31 or from valve chamber 20 occur, the diaphragms of the valve device 5 will move to the left and again open communication from supply passage 29 to chamber 20, and sufficient fluid will be supplied to compensate for the leakage and maintain the pressure in said chamber substantially constant.

If leakage from the brake cylinder 1 should occur, the corresponding fall in pressure in chamber 33 will cause piston 30 to be moved to the left so as to again open the valve 34 and permit fluid under pressure to be supplied to the brake cylinder to compensate for the leakage.

The piston 44 of the emergency valve device 7 is also moved outwardly by the reduction in brake pipe pressure, until the piston engages the spring stop 78. The auxiliary slide valve 47 is thus moved relatively to the main slide valve 46, but not sufficiently to uncover the port 79. In this movement, port 80 in the valve 47 registers with port 81 in slide valve 46, which in turn registers with an exhaust passage 82, so that fluid under pressure is vented from valve chamber 48, and the quick action chamber 72 to prevent further outward movement of the piston 44 toward emergency position.

In this movement, cavity 83 in the auxiliary valve 47 connects port 84 with port 68, so that fluid is vented from the brake pipe 4 through brake pipe passage 17 to passage 85, and past check valve 86 to brake cylinder passage 36. A local venting of fluid from the brake pipe is thus produced, so that quick serial action in service is effected.

When a sudden reduction in brake pipe pressure is made to effect an emergency application of the brakes, the emergency piston 44 will be shifted to emergency position, compressing the spring stop 78. In this movement, the slide valve 47 first moves to uncover port 79, so that fluid under pressure is supplied from valve chamber 48 through passage 51 to quick action piston 49. Said piston is then operated to open the vent valve 52 and permit fluid to be vented from the brake pipe through passage 17 to the atmospheric port 87.

The main valve 46 is then moved, so that cavity 88 connects passage 71 with passage 51. The piston chamber 50 is thus connected to the quick action chamber 72 and the piston 49 is held in its position with the valve 52 open, until the pressure in the quick action chamber 72 blows down by way of the restricted port 89 in piston 49.

In the release position of the emergency slide valve 46, a cavity 90 connects passage 58 with passage 29, so that chamber 57 of the high pressure emergency valve device 11 is charged with fluid from the service reservoir 3. In emergency position, a cavity 91 in the slide valve 46 connects passage 58 with exhaust port 92, so that fluid is vented from chamber 57 and also from chamber 55, and the valve piston 54 is then shifted to the right. Fluid under pressure from the service reservoir 3 is then supplied directly to the passage 59 and thence through passage 36 to the brake cylinder 1.

In the operation of the pilot valve device 5, it is very desirable that the pressure on the diaphragm 15 be maintained constant, since the control of pressure in applying the brakes is dependent upon the pressure. It is possible that the pressure in chamber 24 may vary, due to leakage from the reservoir 2, and in order to compensate for such leakage I provide an additional diaphragm 93, subject on one side to the pressure in chamber 24 and having a chamber 94 at the opposite side, open to the atmosphere by way of port 95. Said diaphragm is subject to the pressure of a spring 96.

When the pressure in the reservoir 2 and in chamber 24 is maintained at the constant pressure for which the apparatus is designed to operate, the diaphragm 93 is moved outwardly against the pressure of spring 96 and has no effect on the diaphragm 15, but if the pressure in chamber 24 should fall below the predetermined constant pressure, to a predetermined extent, say from 70 pounds to 65 pounds, the spring 96 will be effective to exert pressure on diaphragm 15 to the extent that the fluid pressure in chamber 24 has fallen below the predetermined pressure, and thus the pressure acting on the diaphragm 15 will be maintained.

The valve 40 and diaphragm 39 serve as a means for limiting the pressure in the brake cylinder in service applications of the brake. In making service applications of the brakes, the chamber 41 is connected to the atmosphere through passage 42, cavity 91 in emergency slide valve 46, and exhaust port 92, and if the pressure in chamber 38 is increased above a predetermined degree and sufficient to overcome the pressure of spring 43, such pressure being at the desired limit for service applications of the brakes, then the diaphragm 39 will be operated to shift the valve 40 and thus cut off communication from chamber 20 to chamber 31. As a consequence, the pressure in chamber 31 cannot be further increased in a service application of the brakes, and therefore the brake cylinder pressure will be limited to correspond with the limiting pressure supplied to chamber 31.

In an emergency application of the brakes, chamber 41 is connected through passage 42 and port 97 in slide valve 46 with valve chamber 48, and consequently fluid under pressure is supplied to chamber 41. The diaphragm 39 is therefore held in the position opening communication from chamber 20 to chamber 31 by the combined pressures of the spring 43 and fluid under pressure, so that the piston 30 is subjected to the full pressure obtainable, and the maximum emergency brake cylinder pressure is thus obtained.

Having now described my invention, what I claim as new and desire to secure by Letters Patent, is:—

1. In a fluid pressure brake, the combination with a brake pipe and brake cylinder, of a valve device subject to the opposing pressures of the brake cylinder and a pressure chamber for controlling the brakes, and means operative to compensate for loss of pressure in said chamber.

2. In a fluid pressure brake, the combination with a brake pipe and brake cylinder, of means for controlling the supply of fluid under pressure to the brake cylinder including a movable abutment subject on one side to the pressure of a pressure chamber, and means operative to exert pressure on said abutment upon a reduction in pressure in said chamber.

3. In a fluid pressure brake, the combination with a brake pipe and brake cylinder, of means for controlling the supply of fluid under pressure to the brake cylinder including a movable abutment subject on one side to the pressure of a pressure chamber, and an additional movable abutment subject to the opposing pressures of said chamber and a spring for exerting pressure on the first abutment upon a reduction in pressure in said chamber.

4. In a fluid pressure brake, the combination with a brake pipe and brake cylinder, of means for controlling the supply of fluid under pressure to the brake cylinder including a movable abutment subject on one side to the pressure of a pressure chamber, a spring, and means subject to the pressure in said chamber and operated upon a reduction in pressure in said chamber for permitting the pressure of the spring to act on said abutment.

5. In a fluid pressure brake, the combination with a brake pipe and brake cylinder, of means for controlling the supply of fluid under pressure to the brake cylinder including a movable abutment subject on one side to the pressure of a pressure chamber, a spring, and a movable abutment operated by the pressure in said chamber for preventing said spring from exerting pressure on the first diaphragm.

6. In a fluid pressure brake, the combination with a brake cylinder, of a brake controlling valve device comprising valve means for controlling the supply of fluid under pressure to the brake cylinder, a movable abutment operated upon an increase in fluid pressure for operating said valve means, and means operated upon a predetermined increase in pressure on said abutment for cutting off the supply of fluid under pressure to said abutment.

7. In a fluid pressure brake, the combination with a brake cylinder, of a brake controlling valve device comprising valve means for controlling the supply of fluid under pressure to the brake cylinder, a movable abutment operated upon an increase in fluid pressure for operating said valve means, a valve for controlling connection through which fluid under pressure is supplied to said movable abutment, a movable abutment subject to the pressure of fluid supplied to the first abutment for operating said valve, and a spring for opposing the fluid pressure on said second abutment.

8. In a fluid pressure brake, the combination with a brake pipe and brake cylinder, of means for controlling the supply of fluid under pressure to the brake cylinder including a movable abutment subject on one side to the pressure of a pressure chamber, normally charged to the pressure carried in the brake pipe, and means operative to exert pressure on said abutment in case the pressure in said chamber becomes reduced.

9. In a fluid pressure brake, the combination with a brake cylinder, of valve means for controlling the supply of fluid under pressure to the brake cylinder, a movable abutment operated by fluid under pressure for actuating said valve means, a valve for controlling the communication through which fluid under pressure is supplied to said abutment, means operated at a predetermined increase in the pressure of fluid supplied to said abutment for operating said valve to close said communication, and means operative upon effecting an emergency application of the brakes for preventing the operation of said valve to close said communication.

10. In a fluid pressure brake, the combination with a brake cylinder, of valve means for controlling the supply of fluid under pressure to the brake cylinder, a movable abutment operated by fluid under pressure for actuating said valve means, a valve for controlling the communication through which fluid under pressure is supplied to said abutment, a movable abutment subject to the opposing pressures of fluid supplied to the first abutment and a spring for operating said valve, and a valve device operated upon a sudden reduction in brake pipe pressure for supplying fluid under pressure to the spring side of the second abutment.

In testimony whereof I have hereunto set my hand.

THOMAS H. THOMAS.